United States Patent
Breedvelt-Schouten et al.

(10) Patent No.: US 12,061,660 B2
(45) Date of Patent: Aug. 13, 2024

(54) CROSS APPLICATION META HISTORY LINK

(71) Applicant: INTERNATIONAL BUSINESS MACHINES CORPORATION, Armonk, NY (US)

(72) Inventors: Ilse M. Breedvelt-Schouten, Manotick (CA); Jeffrey A. Kusnitz, Campbell, CA (US); Jana H. Jenkins, Raleigh, NC (US); John A. Lyons, Ottawa (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 50 days.

(21) Appl. No.: 17/931,584

(22) Filed: Sep. 13, 2022

(65) Prior Publication Data

US 2024/0086482 A1    Mar. 14, 2024

(51) Int. Cl.
| | |
|---|---|
| *G06F 16/9538* | (2019.01) |
| *G06F 16/93* | (2019.01) |
| *G06F 40/103* | (2020.01) |
| *G06F 40/134* | (2020.01) |
| *H04L 51/066* | (2022.01) |

(52) U.S. Cl.
CPC .......... *G06F 16/9538* (2019.01); *G06F 16/94* (2019.01); *G06F 40/103* (2020.01); *G06F 40/134* (2020.01); *H04L 51/066* (2013.01)

(58) Field of Classification Search
None
See application file for complete search history.

(56) References Cited

U.S. PATENT DOCUMENTS

| | | |
|---|---|---|
| 6,282,548 B1 | 8/2001 | Burner |
| 6,763,496 B1 * | 7/2004 | Hennings .............. G06F 16/957 709/224 |
| 9,021,361 B1 | 4/2015 | Pettinati |
| 9,384,226 B1 * | 7/2016 | Goel .................... G06F 16/951 |
| 9,864,734 B2 | 1/2018 | Chitta |
| 10,769,225 B2 | 9/2020 | Brown |
| 11,947,549 B2 * | 4/2024 | Bern ................... G06F 16/9538 |

(Continued)

OTHER PUBLICATIONS

Deiss et al., "How to Track the Origins of Site Visitors for Your Digital Marketing Campaign," Dummies, Mar. 10, 2017, https://www.dummies.com/article/business-careers-money/business/marketing/track-origins-site-visitors-digital-marketing-campaign-235738/, 5 pages.

(Continued)

*Primary Examiner* — Kim T Nguyen
(74) *Attorney, Agent, or Firm* — Lily Neff (57) ABSTRACT

A method, computer system, and a computer program product for recovering a hyperlink. In one embodiment, the method comprises obtaining an invoked hyperlink from a user. The hyperlink is received by the user to highlight a content. A browser is used to invoke the hyperlink so as to collect associated metadata and other information required to retrieve and open the originating application at any time. This associated metadata and other information is then stored and obtained at a later time by invoking the browser. In addition, responsive to the user searching for the hyperlink, the content can then be opened by the browser using the stored associated metadata and other information.

20 Claims, 3 Drawing Sheets

(56) References Cited

U.S. PATENT DOCUMENTS

| | | | |
|---|---|---|---|
| 2006/0041830 A1 | 2/2006 | Bohn | |
| 2007/0255686 A1* | 11/2007 | Kemp | G06F 16/9535 |
| 2008/0228494 A1* | 9/2008 | Cross | G10L 15/22 |
| | | | 707/E17.119 |
| 2016/0275197 A1* | 9/2016 | Goel | G06F 16/9538 |
| 2021/0319034 A1* | 10/2021 | Bern | G06F 16/9535 |
| 2024/0061992 A1* | 2/2024 | Bhatia | G06F 40/143 |
| 2024/0086482 A1* | 3/2024 | Breedvelt-Schouten | |
| | | | H04L 51/066 |

OTHER PUBLICATIONS

Edri, "Hakuna Metadata—Exploring the browsing history," EDRI. org, Mar. 22, 2017, https://edri.org/our-work/hakuna-metadata-exploring-the-browsing-history/, 4 pages.

IBM, "Message context," IBM.com, Last updated Jul. 24, 2022, Accessed Jul. 25, 2022, https://www.ibm.com/docs/en/ibm-mq/9.0?topic=messages-message-context, 4 pages.

Stack Overflow, Open a URL from Windows Forms, Stack Overflow. com, Accessed Jul. 25, 2022, https://stackoverflow.com/questions/58024/open-a-url-from-windows-forms, 4 pages.

Unknown, "Instance Method—open(_:options:completionHandler:) Attempts to asynchronously open the resource at the specified URL," Developer.Apple.com, Accessed Jul. 25, 2022, https://developer.apple.com/documentation/uikit/uiapplication/1648685-open, 9 pages.

Unknown, "Instance Method—openURL(_:) Deprecated Attempts to open the resource at the specified URL," Developer.Apple.com, Accessed Jul. 25, 2022, https://developer.apple.com/documentation/uikit/uiapplication/1622961-openurl, 8 pages.

* cited by examiner

CROSS APPLICATION META HISTORY LINK

BACKGROUND

The present invention relates generally to the field of data processing and management and more particularly to techniques for providing cross application links.

Hyperlinks, also referred to as links, may be a reference to data that one or more users follow by simply clicking on an online indicia, the link itself or by tapping on a user interface or the like. Hyperlinks can point to a document or even to a specific location in a document. Sometimes text or other documents embed hyperlinks and may be referenced to as hypertext. The text that may be linked in this way may be sometimes referenced as anchor text. Hyperlinks can be used to provide all sorts of important and relevant data to a user. They can provide reference mechanisms such as tables of content, footnotes, indexes, letters, glossaries, and the like.

Many common collaboration tools provide channels where users can exchange information during video meetings and/or during other online conversations. Users often share information during these scenarios through messages containing hyperlinks. Users sometimes open these links and decide to hang on to them because they contain important information. However, they will soon forget about them. Over time, many users end up collecting open web browser pages (that hang on in the browser). Because these contain important information, however, many users (even those that had not gotten to the entire content) would still like to revisit these pages later. In other instances, many conversations ensue simultaneously, making it hard to keep track of the links. It may also become difficult to remember which track was associated with different links and which conversations provided the links.

SUMMARY

Embodiments of the present invention disclose a method, computer system, and a computer program product for recovering a hyperlink. In one embodiment, the method comprises obtaining an invoked hyperlink from a user. The hyperlink is received by the user to highlight a content. A browser invokes the hyperlink so as to collect associated metadata and other information required to retrieve and open the content at any time. This associated metadata and other information is then stored and obtained at a late time by invoking the browser. In addition, responsive to the user searching for the hyperlink, the content can then be opened by the browser using the stored associated metadata and other information.

In another embodiment, in response to the user locating a previously received link in browser history, the user is provided with a flyover indicia showing formatted metadata. This may include an originating application and channel. Once the user selects the indicia, the browser invokes the originating application using the stored (and formatted) metadata. This may contain any channels or message information received that was contained as part of the content. In addition, the originating application opens the message and the content in a way as to highlight the original message received by the user to provide context.

BRIEF DESCRIPTION OF THE SEVERAL VIEWS OF THE DRAWINGS

These and other objects, features and advantages of the present invention will become apparent from the following detailed description of illustrative embodiments thereof, which may be to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods may be disclosed herein; however, it can be understood that the disclosed embodiments may be merely illustrative of the claimed structures and methods that may be embodied in various forms. This invention may, however, be embodied in many different forms and should not be construed as limited to the exemplary embodiments set forth herein. Rather, these exemplary embodiments may be provided so that this disclosure will be thorough and complete and will fully convey the scope of this invention to those skilled in the art. In the description, details of well-known features and techniques may be omitted to avoid unnecessarily obscuring the presented embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
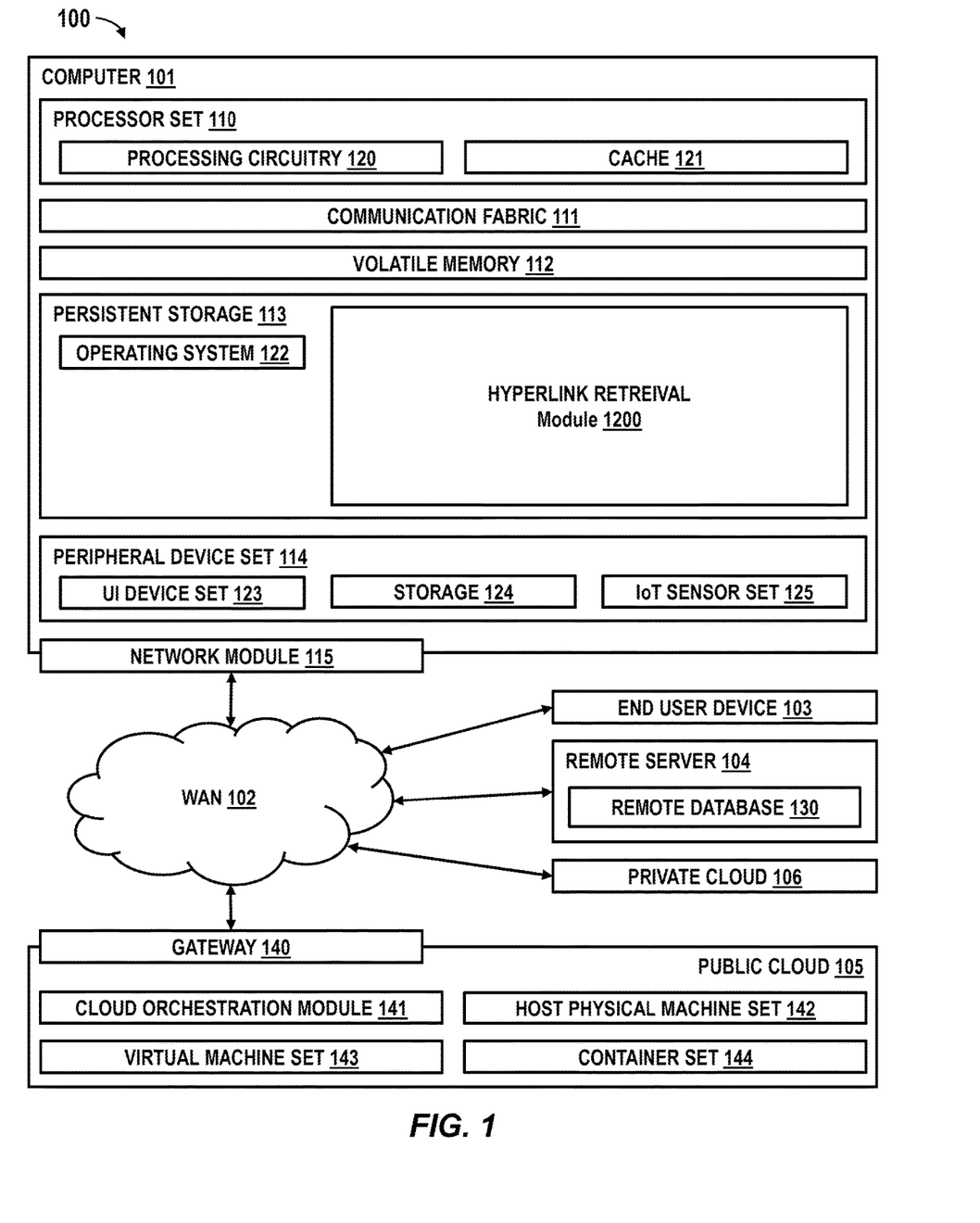
FIG. 1 illustrates a networked computer environment according to at least one embodiment.

FIG. 1 provides a block diagram of a computing environment 100. The computing environment 100 contains an example of an environment for the execution of at least some of the computer code involved in performing the inventive methods, such as code change differentiator which is capable of providing a hyperlink retrieval module (1200). In addition to this block 1200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 1200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 of FIG. 1 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 1200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 1200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
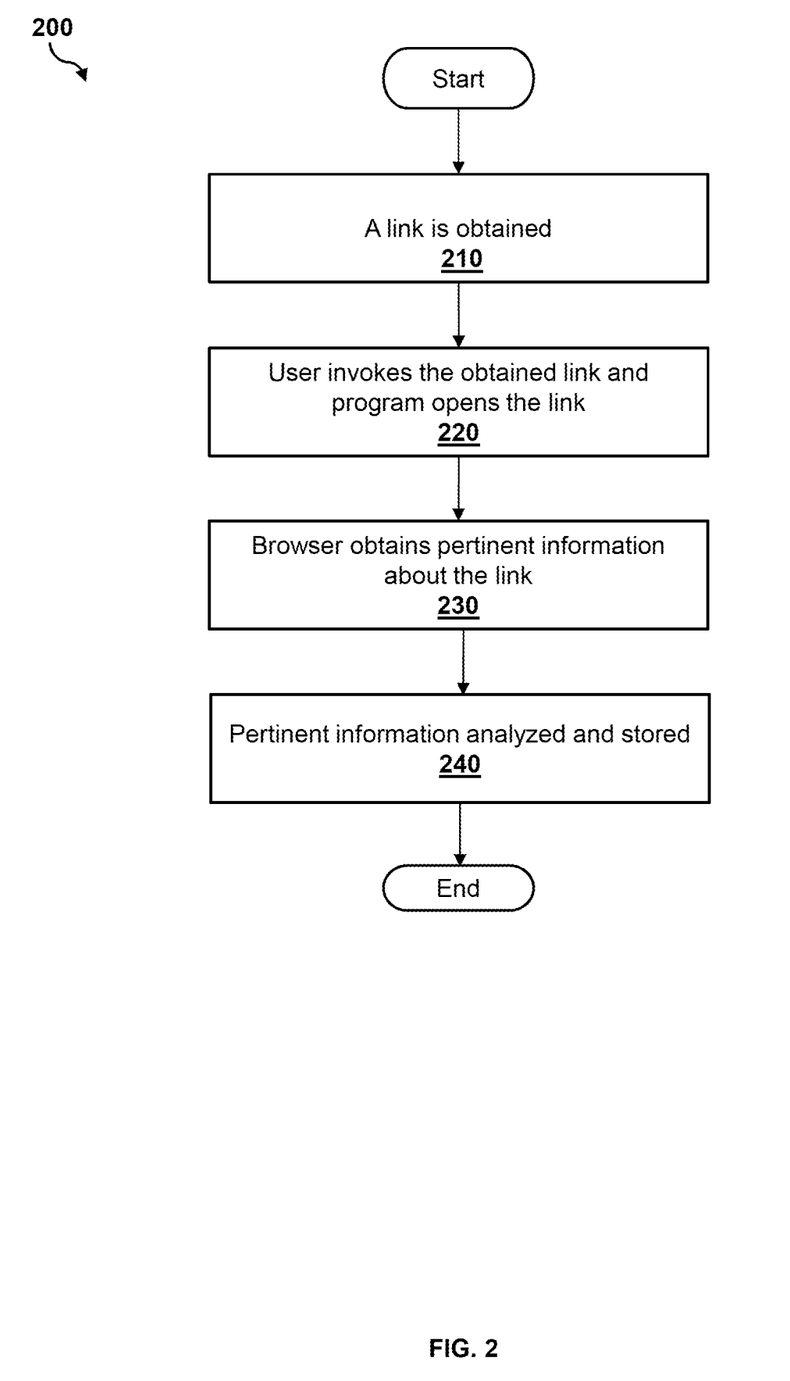
FIG. 2 provides an operational flowchart for generating cross application hyperlinks where a user invokes the hyperlink according to one embodiment.

FIG. 2 provides techniques to locate a hyperlink received by a user at any time. The process 200 provides a cross application meta history link to help with this technique. In one embodiment, this will allow a user to navigate from a browser history entry back to where the link was invoked from by including the metadata (such as about origin in a browser page history entry). In the embodiment of FIG. 2, the user may invoke a link received in a message containing the link via a predetermined application.

In Step 210, the process starts with the user, such as in an application, obtaining a link. In one embodiment, the link is receiving as part of a content that can be received in a document, an email, through a message, a messaging application or through other similar means. In one scenario, for ease of understanding Slack™ (Slack is a registered trademark of Slack Technologies, Inc.) is used. Slack is a messaging and communication application that supports asynchronous work. The users are organized by their membership in channels and information can be shared in the channel. In this manner same information can be distributed and shared to all members of the channel at the same time.

In Step 220, the user may then invoke the link. This may be as simple as clicking on the hyperlink or it may be more involved. In one embodiment, the computing system used includes an operating system that will then be invoked. For example, in one embodiment, the program, such as the Slack program, then calls the operating system to "open a web page" link with the link and application and/or channel and message metadata information. The webpage may be associated with the link including any metadata containing the predetermined application. In one embodiment, the predetermined application can be a channel or message information program such as was discussed in relation to Slack.

In Step 230, a browser is invoked, such as by a system or processor, using the link. In one embodiment, this can include the metadata. In one embodiment, application specific metadata of the location of the original application may be obtained. This may be the information that can be used to identify the location of that the particular link was originated from. In an application like Slack, this can be the Slack channel where the actual link was posted.

In Step 240, the browser may be used to obtain and analyze the information. The analysis will then provide any information that may be deemed to be pertinent to be obtained. In one embodiment, the pertinent information may include the metadata with the history of the particular link and opens any supplied uniform resource location (URL). The browser then stores this information.

Figure 3:
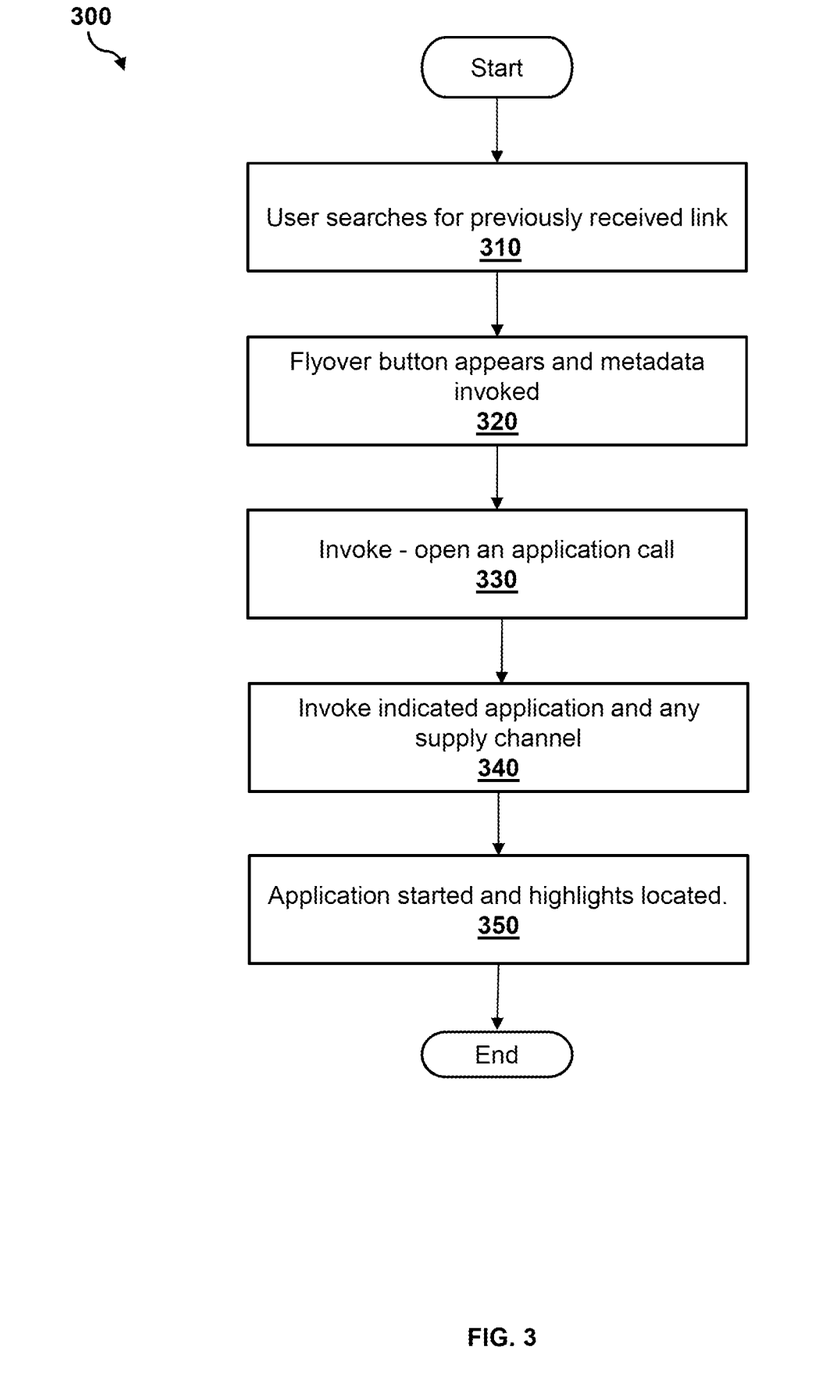
FIG. 3 provides an operational flowchart for generating cross application hyperlinks in response to a user locating a previously received hyperlink in browser history, according to an alternate embodiment.

FIG. 3 provides another flowchart depicting a reverse flow process 300. The process of 300 may be a subsequent flow to FIG. 2. In this junction, the user can use what the initial process 200 set up to recuperate the links.

In step 310, the user starts a search for the previously received link. At this junction, the link can be easily restored, for example, by looking at the browser history (to find the previously stored link). In one scenario, the user may simply visit the browser tab or history list item and select the interface (URL bar icon or history list) to invoke the metadata information. This provides (reads) the channel/user or message application requested that the page may open.

In Step 320, the user can just click over the flyover rendered metadata. In one embodiment, a flyover rendering that allows the invoking of the search may appear. For example, in one scenario, a graphical mouse or other similar user interface may appear as a rendering, illustrating a formatted metadata (e.g., application name, channel etc.). In one embodiment, just hovering over the rendered image may be sufficient to invoke the action. In one scenario as provided in the illustration, the flyover button appears to invoke the metadata.

In Step 330, the system invokes an open application call. In this scenario, the browser may invoke "an open application" call, such as by using an operating system. The call may be performed with the previously stored metadata that will be supplied at this junction.

In Step 340, the indicated application and any supply channel may be invoked. In one embodiment, the operating system can invoke the indicated application. This will in turn supply the channel or message metadata when applicable. In the previous example, the browser may communicate the metadata to the operating system. The operating system then opens the application Slack that fees the metadata to Slack (channel etc.).

In Step 350, the application such as the Slack application in this example, starts (if not already open) and locates the original message. In one embodiment, the original message will also be highlighted. In other words, the application finds/highlights the message in the channel/chat where the link originated. The user can then easily review the (channel) message previously sent and/or communicated. It should be noted, that in this embodiment, the links were not simply being saved as the user navigates from one application to another. Rather, the user is actually returned to the original application once the system invokes it.

The process of FIGS. 2 and 3 provide a means to improve retrievability of the context of a web page when originating from another application. This provides a secure solution (can be only operating system only if desired) where any non-public information needs not to be included in the link itself. In this way, the solution also provides improved collaboration (context to sources of interest such as web pages). It has other indirect benefits such as providing assistance to users with disability where information provided may become overwhelming. It also provides an opportunity to return to a source, even after a long time, refresh-return to frame of mind.

To makes such advantages more understandable, a scenario can be presented where a user Jackie may be a project leader and responsible for several projects in her company. She uses Slack, e-mail and some other web based conferencing applications on a continuous basis to communicate with the teams involved. Her teams may be very engaged with the work, and they share a lot of information with each other. She may be eager to click on the shared links and review the information, but she always has to decide to review them later. Most times she only had the opportunity to review the web pages in her browser a few days later. In one instance, she looks at a very interesting web page that could be related to some of her projects. However, she forgot who sent her the link. She looks through her Slack conversations, but really can't remember who sent the web page.

Using the process of FIGS. 2 and 3, these problems can be avoided. In a slightly different scenario, Jackie, a few days later reviews a few web pages in her browser and finds a very interesting web page. She clicks on the URL bar icon that shows where the page was invoked from, she clicks on the link in the fly-out, and she gets redirected to the Slack conversation (channel or multiple people). Using the process, this time, she can easily provide feedback on the provided link in the right context.

In addition, when there may be a persistent data in applications (e.g., Slack, e-mail etc.), the process can bring the user back to the source of the link with context. In a different example where the nature of the situation provides transient data in applications (e.g., Chat in video conference), the context of the link can still be provided and be a very useful source. In one embodiment, such as with video conferring applications, the person setting up the meeting can even provide/retain a log of the meeting to expand the linking possibilities.

The descriptions of the various embodiments of the present invention have been presented for purposes of illustration but may be not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for recovering a hyperlink, comprising;
   obtaining an invoked hyperlink from a user as part of a content; wherein said hyperlink is received by said user to highlight at least a part of said content;
   invoking a browser using said hyperlink so as to collect an associated metadata associated with said hyperlink and other associated information required to retrieve and opening said content and said hyperlink at any time;
   storing said associated metadata and other associated information obtained by invoking said browser in a database; and
   responsive to said user searching for any hyperlink, providing previous hyperlink history and opening said hyperlink that was stored and said at least part of said content that is highlighted by using said browser and said stored associated metadata and said other information.

2. The method of claim 1, wherein said content was received as part of an online message and includes an originating application and/or a channel for accessing said hyperlink.

3. The method of claim 2, wherein said content includes a web page and said associated information is stored as part of said browser history.

4. The method of claim 3, wherein said content including said webpage is recovered and opened when said user searches said browser history.

5. The method of claim 4, further comprising: presenting to said user a flyover indicia showing formatted metadata including said originating application and/or a channel presenting in response to said user searching said browser history.

6. The method of claim 5, further comprising:
   invoking by said browser said originating application and/or channel to open said hyperlink using a formatted metadata.

7. The method of claim 6, further comprising:
   invoking said originating application using said formatted metadata containing said application and/or channel, in response to said user selecting said flyover indicia.

8. The method of claim 7, wherein said originating application opens to highlight said message as sent originally to said user to provide a context in which said message was originated.

9. A computer system for recovering a hyperlink, comprising;
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is enabled to perform the steps:
   obtaining an invoked hyperlink from a user as part of a content; wherein said hyperlink is received by said user to highlight at least a part of said content;
   invoking a browser using said hyperlink so as to collect an associated metadata associated with said hyperlink and other associated information required to retrieve and opening said content and said hyperlink at any time;
   storing said associated metadata and other associated information obtained by invoking said browser in a database; and
   responsive to said user searching for any hyperlink, providing previous hyperlink history and opening said hyperlink that was stored and said at least part of said content that is highlighted_by using said browser and said stored associated metadata and said other information.

10. The computer system of claim 9, wherein said content was received as part of an online message and includes an originating application and/or a channel for accessing said hyperlink.

11. The computer system of claim 10, wherein said content includes a web page and said associated information is stored as part of said browser history and said webpage is recovered and opened when said user searches said browser history.

12. The computer system of claim 11, further comprising:
   presenting to said user a flyover indicia showing formatted metadata including said originating application and/or a channel presenting in response to said user searching said browser history a webpage and said hyperlink is received as part of an online message and/or channel. wherein said user searches for locating a previously received hyperlink in a browser history.

13. The computer system of claim 12, further comprising:
   invoking by said browser said originating application and/or channel to open said hyperlink using a formatted metadata.

14. The computer system of claim 13, further comprising:
   invoking said originating application using said formatted metadata containing said application and/or channel, in response to said user selecting said flyover indicia.

15. The computer system of claim 14, wherein said originating application opens to highlight said message as sent originally to said user to provide a context in which said message was originated.

16. A computer program product, comprising:
   one or more computer-readable storage medium and program instructions stored on at least one of the one or more tangible storage medium, the program instructions executable by a processor, the program instructions comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is enabled to perform the steps comprising:

obtaining an invoked hyperlink from a user as part of a content; wherein said hyperlink is received by said user to highlight at least a part of said content;

invoking a browser using said hyperlink so as to collect an associated metadata associated with said hyperlink and other associated information required to retrieve and opening said content and said hyperlink at any time;

storing said associated metadata and other associated information obtained by invoking said browser in a database; and     responsive to said user searching for any hyperlink, providing previous hyperlink history and opening said hyperlink that was stored and said at least part of said content that is highlighted by using said browser and said stored associated metadata and said other information.

17. The computer program product of claim 16, wherein said content was received as part of an online message and includes an originating application and/or a channel for accessing said hyperlink; and wherein said content includes a web page and said associated information is stored as part of said browser history and said webpage is recovered and opened when said user searches said browser history.

18. The computer program product of claim 17, wherein said user searches for locating a previously received hyperlink in a browser history; and wherein in response to said user searching a previous hyperlink in said browser history, presenting to said user a flyover indicia showing formatted metadata including an originating application and/or a channel.

19. The computer program product of claim 18, further comprising:

invoking by said browser said originating application and/or channel to open said hyperlink using a formatted metadata;

invoking said originating application using said formatted metadata containing said application and/or channel, in response to said user selecting said flyover indicia.

20. The computer program product of claim 19, wherein said originating application opens to highlight said message as sent originally to said user to provide a context in which said message was originated.

* * * * *